United States Patent [19]

Usui et al.

[11] 4,114,746
[45] Sep. 19, 1978

[54] OVERRUNNING CLUTCH DEVICE FOR ENGINE STARTING UNIT

[75] Inventors: Kazuhisa Usui, Fukaya; Osamu Muto, Nitta, both of Japan

[73] Assignee: Sawafuji Denki Kabushiki Kaisha, Tokyo, Japan

[21] Appl. No.: 783,442

[22] Filed: Mar. 31, 1977

[30] Foreign Application Priority Data

May 18, 1976 [JP] Japan .................................. 51-56126

[51] Int. Cl.² ............................................. F16D 23/10
[52] U.S. Cl. ...................................... 192/104 R; 74/6
[58] Field of Search ............. 192/104 R, 104 B; 74/6

[56] References Cited

U.S. PATENT DOCUMENTS

| | | | |
|---|---|---|---|
| 2,839,935 | 6/1958 | Hartzell et al. | 74/6 |
| 3,263,509 | 8/1966 | Digby | 74/6 |
| 3,318,162 | 5/1967 | Sabatini | 74/6 |
| 3,646,820 | 3/1972 | Vogel et al. | 74/6 |
| 3,915,020 | 10/1975 | Johnson | 192/104 R X |

FOREIGN PATENT DOCUMENTS 1,311,616 10/1962 France .................. 192/104 R

*Primary Examiner*—Edgar W. Geoghegan
*Attorney, Agent, or Firm*—Haseltine, Lake & Waters

[57] ABSTRACT

An overrunning clutch device including a thrust ring slidably fitted in the driven clutch member and held connected with the driving clutch member and a set of spherical centrifugal weights mounted on respective radially flexible resilient arms of a weight retainer, which is fixed to the driven clutch member integral with a drive pinion. The centrifugal weights are held in rolling contact with a tapered annular guide surface of the thrust ring and act to force the latter and hence the driving clutch member away from the driven clutch member under centrifugal force when their speed of rotation exceeds a predetermined level.

4 Claims, 3 Drawing Figures

OVERRUNNING CLUTCH DEVICE FOR ENGINE STARTING UNIT

BACKGROUND OF THE INVENTION

This invention relates to engine starting apparatus for automobiles or the like vehicles and more particularly to overrunning clutch devices used with such apparatus to prevent torque transmission in reverse direction, that is, from the engine just started to the engine starter.

As is well known, an engine starter normally includes a starter motor, a drive pinion slidably mounted on the output shaft thereof for meshing engagement with the ring gear of the associated engine and an overrunning clutch designed to serve the purpose of breaking the driving connection between the drive pinion and the starter motor immediately after the engine has been started when the pinion is about to be driven at increased speed by the ring gear of the engine.

Previous forms of overrunning clutch device, however, have generally been unsatisfactory in performance, production cost and service life.

SUMMARY OF THE INVENTION

In view of the above, the present invention has for its object the provision of a new and improved overrunning clutch device which is smoother in operation, more durable and simpler in structure than conventional devices of the kind described.

According to the present invention, there is provided an overrunning clutch device which comprises: a one-way clutch including a driven clutch member associated integrally with the drive pinion, mounted on the output shaft of a starter motor, a driving clutch member slidably mounted on the motor output shaft for driving engagement with the driven clutch member and disengagement therefrom, and a clutch spring arranged normally to urge the driving clutch member into driving engagement with the driven clutch member; an annular weight retainer formed around the outer periphery thereof with a plurality of radially flexible resilient arms and secured to the driven clutch member coaxially therewith; a plurality of spherical-shaped centrifugal weights each rotatably mounted on the respective one of the resilient arms of the weight retainer; and a thrust ring connected with the driving clutch member and held in sliding engagement with the centrifugal weights so as to force the driving clutch member out of engagement with the driven clutch member against the urge of the clutch spring under the thrust of the centrifugal weights when the latter are subjected to a centrifugal force of a magnitude exceeding a predetermined value.

The above and other objects, features and advantages of the present invention will become apparent from the following detailed description when taken in conjunction with the accompanying drawing, which illustrates one preferred embodiment of the invention.

DESCRIPTION OF THE PREFERRED EMBODIMENT

Figure 1:
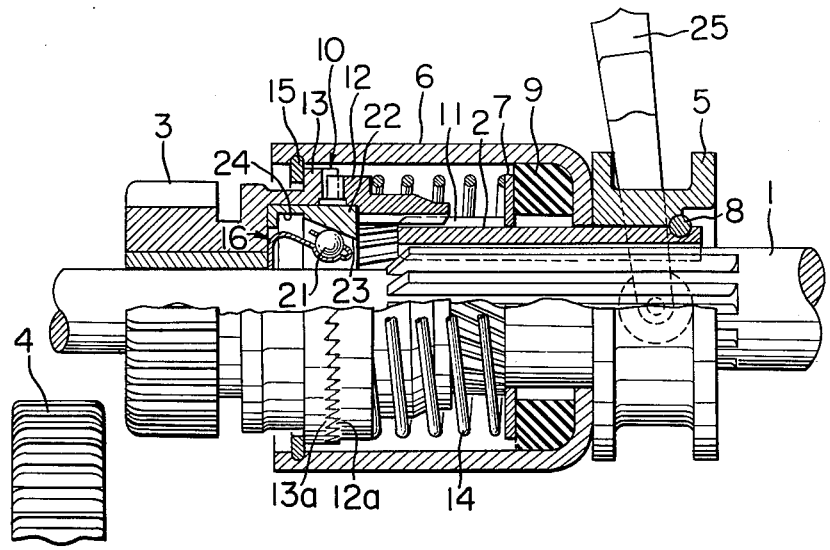
FIG. 1 is a side elevational view, partly in vertical cross section, of an overrunning clutch device embodying the present invention, illustrating the essential parts thereof and the associated members of the engine starter.

Referring to the drawing and first to FIG. 1, reference numeral 1 indicates the output shaft of a starter motor; and 2 indicates an advance sleeve spline-fitted over the motor output shaft 1 for axial sliding movement. A drive pinion 3 is also mounted on the motor output shaft 1 for rotation and axial sliding movement relative thereto in a position forward of the advance sleeve 2 (i.e., to the left of the sleeve as viewed in FIG. 1). Reference numeral 4 indicates the ring gear of the associated automotive engine (not shown), positioned forward of the drive pinion 3 so that the latter when advanced is placed in meshing engagement with the ring gear.

Reference numeral 5 indicates an actuating ring slidably fitted over the advance sleeve 2 adjacent to the rear end thereof; 6 indicates a tubular clutch casing having an end wall slidably fitted over the advance sleeve 2 in a position adjacent to the actuating ring 5 on the front side thereof; 7 indicates an annular stop plate fixed to the advance sleeve 2 intermediate the ends thereof; 8 indicates a circlip fixed to the rear end of advance sleeve 2; and 9 indicates an annular cushioning member interposed between the stop plate 7 and the end wall portion of tubular clutch casing 6 and formed of rubber or the like elastic material. In this manner, the actuating ring 5 and the end wall of clutch casing 6 are normally held pressed against each other between the circlip 8 and cushioning member 9, and the clutch casing 6 is slidable along the advance sleeve 2 forwardly in a direction away from the actuating ring 5 within the range of axial elastic deformation of the cushioning member 9.

Reference numeral 10 generally indicates a uni-directional or one-way clutch accommodated in the tubular clutch casing 6 to allow torque transmission only in the direction from the advance sleeve 2 to drive pinion 3 and consisting of a driving clutch member 12, a driven clutch member 13 and a clutch spring 14 arranged under compression between the stop plate 7 and the driving clutch member 12. Reference numeral 11 indicates a helical spline formation on the outer periphery of the advance sleeve 2 extending between its forward end and the stop plate 7. The driving clutch member 12, being internally helical-splined, is slidably fitted over the splined end portion of the advance sleeve 2. The driven clutch member 13 is formed integral with the drive pinion 3 on the rear side thereof and generally dish-shaped. The driving clutch member 12 is normally urged by the clutch spring 14 into engagement with the driven clutch member 13, as illustrated. The two clutch members 12 and 13 are formed on their adjoining end faces with sawtooth-like clutch teeth 12a and 13a, respectively, for unidirectional drive therebetween. The driven clutch member 13 is formed around the periphery thereof with a forwardly facing annular shoulder surface for abutting engagement with a stop element or circlip 15 secured to the inner periphery of tubular clutch casing 6 at the forward, open end thereof. As illustrated, both the driving and driven clutch members 12 and 13 are accommodated coaxially in the tubular clutch casing 6.

Figure 2:
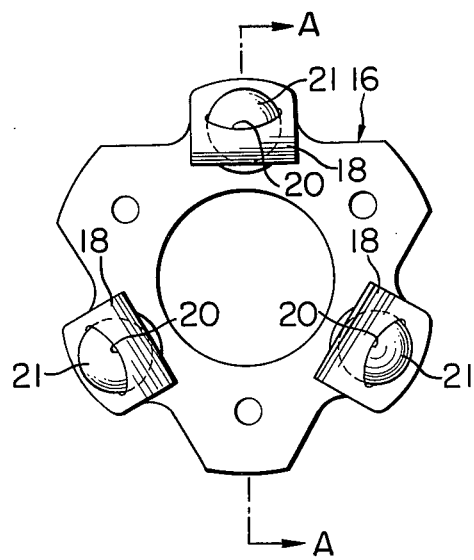
FIG. 2 is an enlarged rear view of the weight retainer shown in FIG. 1.
Figure 3:
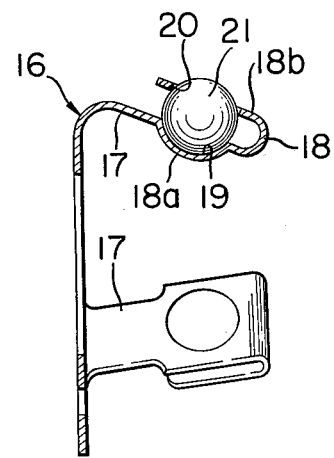
FIG. 3 is a cross-sectional view of same, taken along the line A—A in FIG. 2.

Secured to the rear surface of the hub portion of driven clutch member 13 coaxially therewith is an annular weight retainer formed of a sheet of spring steel, as generally indicated at 16 in FIG. 1. Referring next to FIGS. 2 and 3, the weight retainer 16 is formed around the outer periphery thereof with a plurality of resilient arms 17 of substantial length. As illustrated, the resilient arms 17 are circumferentially spaced at equal intervals and are each bent generally rearwardly so as to be radially flexible. More specifically, each of the resilient arms 17 is bent back on its radially outer side to form a generally U-shaped end portion 18, which consists of a pair of radially inner and outer walls 18a and 18b formed in positions opposite to each other with a part-spherical depression 19 and a round opening or window 20, respectively. Reference numeral 21 indicates spherical-shaped centrifugal weights each rotatably mounted on one of the resilient arms 17. As illustrated, the spherical centrifugal weight 21 is inserted into the U-shaped end portion 18 of the resilient arm 17 and seated in the part-spherical depression 19 and the round opening 20, more or less protruding radially outwardly through the opening 20.

Referring again to FIG. 1, reference numeral 22 indicates a thrust ring slidably fitted in the driven clutch member 13 and held in abutting engagement with the driving clutch member 12 for axial sliding movement therewith. The thrust ring 22 is an annular block having a cylindrical outer peripheral surface and formed around the inner periphery thereof with a tapered annular guide surface 23, which increases in diameter forwardly or in an axial direction toward the driven clutch member 13, and an annular groove 24 adjoining the forward or largest-diameter end of the tapered guide surface 23. As illustrated, the thrust ring 22 is normally positioned with the tapered guide surface 23 held in pressure engagement with the spherical centrifugal weights 21, flexing the resilient arms 17 radially inwardly against the resilience thereof. It is to be noted, however, that the thrust of the centrifugal weights 21 acting on the tapered guide surface 23 under the bias of resilient arms 17 thus flexed is normally insufficient to cause the driving clutch member 12 to retract against the forward urge of clutch spring 14.

Further in FIG. 1, reference numeral 25 designates a shift lever pivotally connected at one end to the actuating ring 5 and rockable under the control of electromagnetic actuator means, not shown, to axially shift the actuating ring 5.

Description will next be made of the operation of the embodiment described above.

In starting the engine, the shift lever 25 is rocked clockwise by the associated electromagnetic actuator means, not shown, to forwardly shift the actuating ring 5 and hence the clutch casing 6 thereby to bring the drive pinion 3 into meshing engagement with the ring gear 4. On this occasion, if the drive pinion 3 hits upon the ring gear 4 on account of some angular misalignment of their teeth, the advancing movement of the drive pinion 3 and the clutch members 12 and 13 is momentarily interrupted while the clutch casing 6 continues to advance compressing the clutch spring 14 so that the driving clutch member 12 fitted over the advance sleeve 2 is caused to slide rearwardly relative thereto and thus turned in a predetermined direction owing to the helical-splined connection (11) therebetween. Simultaneously with this, the drive pinion 3 is turned in the same direction together with the driven clutch member 13 and, when the teeth of drive pinion 3 are brought into angular alignment with those of ring gear 4, the pinion 3 is advanced under the urge of clutch spring 14 into meshing engagement with the ring gear 4.

At this point, the starter motor is energized and its output shaft 1 begins to turn the drive pinion 3 through the medium of the advance sleeve 2 and the two intermeshing driving and driven clutch members 12 and 13, and the ring gear 4 now in mesh with the drive pinion 3 is driven to start the associated engine, not shown.

In this connection, it is to be understood that the helical splines 11 formed on the advance sleeve 2 and those on the driving clutch member 12 have such a lead as to exert a forward thrust on the driving clutch member 12 when the advance sleeve 2 is turned, that is, in a normal direction. Accordingly, when the starter motor is energized, the driving clutch member 12 is advanced under the thrust to cause compressive deformation of the cushioning member 9 through the medium of driven clutch member 13, circlip 15 and clutch casing 6 so that any undersirable shock in torque transmission in the starting operation can be effectively absorbed.

Immediately after the engine has been started, if and when the drive pinion 3 still in mesh with the ring gear 4 is turned by the latter at a rate higher than that of rotation of the motor output shaft 1, there takes place a slippage in the one-way clutch 10, that is, the meshing clutch teeth 12a and 13a slide axially along each other because of their sawtooth configuration in a direction to drive the driving clutch member 12 rearwardly against the urge of clutch spring 14. On the other hand, the centrifugal weights 21 mounted on the retainer 16 roll along the annular guide surface 23 of thrust ring 22, revolving with the driven clutch member 13, to which the retainer 16 is fixed, and, when the speed of rotation of the drive pinion 3 is increased to reach a predetermined level, are moved radially outwardly together with the resilient arms 17 of weight retainer 16 under the centrifugal force to force the thrust ring 22 and hence the driving clutch member 12 axially rearwardly against the forward urge of clutch spring 14 until they are received in the annular groove 24 in the thrust ring 22 and thus held against any further radially outward movement. In this manner, the one-way clutch 10 is completely disengaged with its driving member 12 placed out of meshing engagement with the driven member 13 so that there is no reverse torque transmission from the engine started to the starter motor. The centrifugal weights 21 once received in the annular groove 24 are held engaged therein to maintain the one-way clutch 10 in its disengaged state, even if there is more or less fluctuation in revolution of the drive pinion 3, because of the annular shoulder defined between the annular groove 24 and tapered guide surface 23, which resists the tendency, if any, of the centrifugal weights 21 to get out of the annular groove 24 and ride back on the guide surface 23. While rolling around in the annular groove 24, the centrifugal weights 21 are lubricated with lubricant oil provided in the annular groove 24, and such lubricating oil is carried to and held in the part-spherical depressions 19 formed in the weight-carrying resilient arms 17 for further lubrication of the centrifugal weights 21.

After the engine starting, the clutch casing 6 is retracted as the shift lever 25 is rocked to the right and the starter motor is brought to rest so that the drive pinion 3 comes to rest in a state disengaged from the ring gear 4. As a consequence, the centrifugal weights 21, now free from any centrifugal force, are forced radially inward together with the respective resilient arms 17 by the thrust ring 22, which advances together with the driving clutch member 12 under the urge of clutch spring 14, and the driving clutch member 12 is brought again into meshing engagement with the driven clutch member 13 ready for another cycle of starting operation.

To summarize, in the device of the present invention the one-way clutch 10 arranged between the output shaft 1 of the starter motor and the ring gear 3 of the associated automotive engine is temporarily held in an open or disengaged state in an automatic manner, immediately after the engine has been actually started, under the effect of the centrifugal weights 21 acting upon the thrust ring 22 to force the latter axially rearward, so that there is no danger that the starter motor be driven forward in excess by the engine just started. This not only effectively prevents any damage to the starter motor as might result from such reverse drive but also alleviates the engine load, enabling the engine started to run by itself in a stable manner. Further, the spherical-shaped centrifugal weights 21, being held inserted in the U-shaped end portions 18 of the respective resilient arms 17 of weight retainer 16 and each rotatably seated in the part-spherical depression 19 and round window 20 formed in the inner and outer walls 18a and 18b of the associated U-shaped arm end portion 18, are each supported over a substantially extended area under a reduced holding pressure and thus smoothly rotatable with the aid of the lubricating effect of the lubricant oil held securely in the part-spherical depression 19 and that in the annular groove 24 in the thrust ring 22. This ensures an extended period of service life of the centrifugal weights 21 while enabling them at all times to act upon the thrust ring 22 effectively without fail. In addition, the weight retainer 16 is extremely simple in structure as described herein and obtainable at minimized cost, rendering the entire device inexpensive.

Though one preferred embodiment has been shown and described, it will be apparent to those skilled in the art that various changes and modifications may be made therein without departing from the spirit of the invention and the scope of the appended claims.

What is claimed is:

1. In an engine starter including a starter motor and a drive pinion slidably mounted on the output shaft of said starter motor for meshing engagement with the ring gear of the associated engine, an overrunning clutch device comprising:

a one-way clutch including a driven clutch member associated integrally with the drive pinion, a driving clutch member slidably mounted on the output shaft of the starter motor for driving engagement with said driven clutch member and disengagement therefrom, and a clutch spring arranged normally to urge said driving clutch member into driving engagement with said driven clutch member;

an annular weight retainer formed around the outer periphery thereof with a plurality of radially flexible resilient arms and secured to said driven clutch member coaxially therewith;

a plurality of spherical-shaped centrifugal weights each rotatably mounted on the respective one of said resilient arms of said weight retainer; and a thrust ring connected with said driving clutch member and held in sliding engagement with said centrifugal weights so as to force said driving clutch member out of driving engagement with said driven clutch member against the urge of said clutch spring under the thrust of said centrifugal weights when the latter are subjected to a centrifugal force of a magnitude exceeding a predetermined value.

2. An overrunning clutch device as defined in claim 1, in which said resilient arms of said weight retainer are arranged circumferentially at equal intervals and each include a U-shaped end portion consisting of a pair of radially inner and outer walls formed in positions opposite to each other with a part-spherical depression and a round opening, respectively, in cooperation to rotatably hold the associated spherical centrifugal weight therebetween.

3. An overrunning clutch device as defined in claim 1, in which said thrust ring is an annular block formed around the inner periphery thereof with a tapered annular guide surface increasing in diameter in an axial direction toward said driven clutch member and an annular groove adjoining the largest-diameter end of said tapered annular guide surface.

4. An overrunning clutch device as defined in claim 1, further comprising:

an advance sleeve fitted over the output shaft of the starter motor for axial sliding movement relative thereto and provided with a helical spline formation for slidable fitting engagement with said driving clutch member;

a tubular clutch casing having an end wall slidably fitted over said advance sleeve and accommodating said driving and driven clutch members;

an annular stop plate fixedly fitted over said advance sleeve;

a cushioning member interposed between said stop plate and said end wall of said clutch casing; and a stop element secured to the inner periphery of said clutch casing adjacent to the open end thereof for abutting engagement with said driven clutch member.

* * * * *